United States Patent [19]

Koch et al.

[11] 4,336,012

[45] Jun. 22, 1982

[54] COEXTRUSION DEVICE

[75] Inventors: Paul E. Koch, Chagrin Falls; Thomas J. Bond; Richard C. Adams, both of Chardon, all of Ohio

[73] Assignee: The Standard Oil Company, Cleveland, Ohio

[21] Appl. No.: 198,312

[22] Filed: Oct. 20, 1980

[51] Int. Cl.³ .............................. B29F 3/04; B29F 3/00
[52] U.S. Cl. ............................... 425/131.1; 425/376 R; 425/462
[58] Field of Search ................. 425/130, 131.1, 131.5, 425/133.1, 133.5, 462, 132, 463, 135.5; 264/171, 241, 245

[56] References Cited

U.S. PATENT DOCUMENTS

| | | | |
|---|---|---|---|
| 3,461,197 | 8/1969 | Lemelson | 264/171 |
| 3,464,087 | 9/1969 | Koch | 425/131 |
| 3,559,239 | 2/1971 | Work et al. | 264/171 |
| 3,694,292 | 9/1972 | Schippers et al. | 425/191 |
| 3,761,211 | 9/1973 | Parkinson | 425/462 |
| 3,876,743 | 4/1975 | Soderlund et al. | 425/461 |
| 3,985,484 | 10/1976 | Takiura | 425/376 |
| 4,081,232 | 3/1978 | Pemberton et al. | 425/192 R |
| 4,144,011 | 3/1979 | Sponaugle | 425/462 |

Primary Examiner—Willard E. Hoag

Attorney, Agent, or Firm—Joseph G. Curatolo; Herbert D. Knudsen; Larry W. Evans

[57] ABSTRACT

The coextrusion device (20) of the present invention can be used with conventional extruders (24–26) and extrusion dies (90) for forming layered products (91) from at least two materials. It includes a manifold (21) for receiving a plurality of extruded feed materials (A, B, C) and a feedblock (22) receiving the feed materials from the manifold. The feedblock includes first and second faces (43, 52), entrance ports (40, 41, 42) in the first face corresponding to the number of feed materials, channel means (50, 60, 70) passing through the feedblock between the first and second faces directing each feed material into at least one separate profile, and exit ports (51, 61, 71) in the second face corresponding to the number of channel means, defining a first profile for each feed material. An adaptor (23) is provided for receiving the first profiles from the feedblock and includes first and second faces (82, 85), an entrance port (83) in the first face receiving said first profiles, an exit port (84) in the second face corresponding to the entrance of the extrusion die and, a transition zone (86) between the entrance and exit ports wherein the first profiles become contiguous and the overall configuration of the contiguous first profiles is adapted for receipt by the extrusion die. The device can further include a reverser plate (110) and alternate feedblocks (130) having different exit ports (139, 140, 152, 153).

30 Claims, 23 Drawing Figures

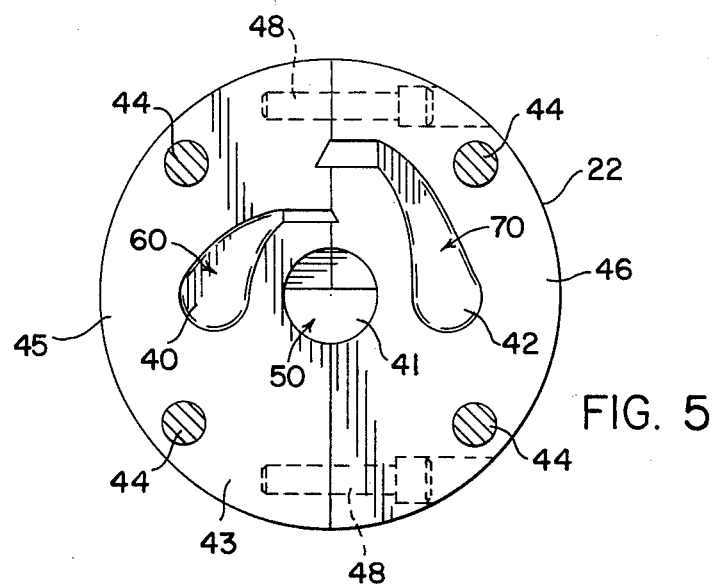

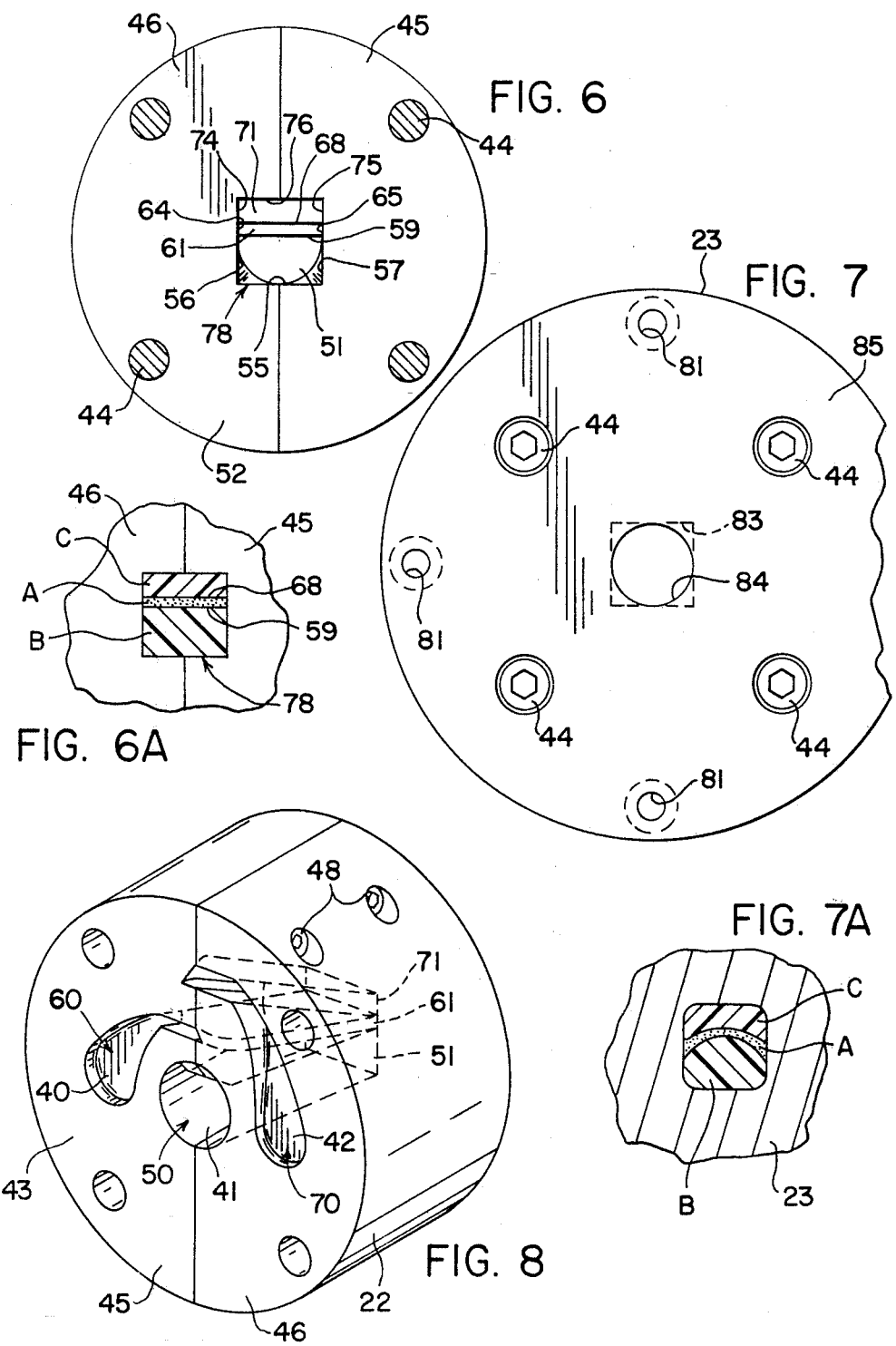

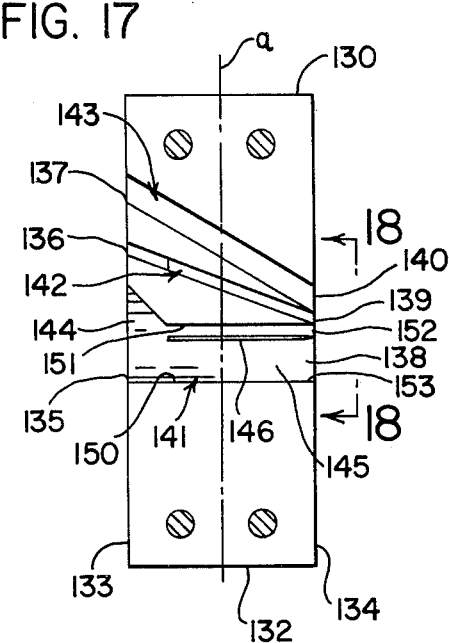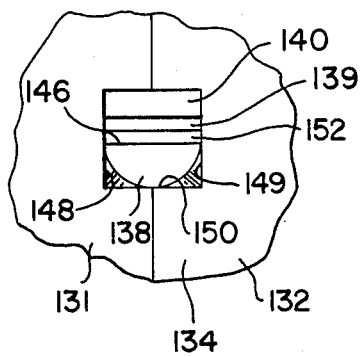

COEXTRUSION DEVICE

TECHNICAL FIELD

The present invention is directed toward a novel coextrusion device which permits the simultaneous extrusion or coextrusion of multiple molten layers to form various articles such as films, sheets, tubing, profiles and the like. A method is also provided for reducing perturbation while coextruding. Typically, coextruded sheets are useful as packaging materials wherein different plastics are combined to offer varying degrees of gas barrier properties, moisture resistance, improved appearance and lower economics, to name a few. Coextrusion permits the use of expensive, high performance polymers with lower cost commodity polymers providing the useful properties of the former without the attendant costs of a 100 percent sheet thereof. For some embodiments a filler layer can be sandwiched between two external layers having more desirable properties. In others, two useful but dissimilar polymers can be employed to provide sheets with different properties.

The objective of coextrusion apparatus and systems is to provide layered products such as films and sheets having plies of uniform thickness. It is also desirable to be able to vary the thickness of different plies as well as the number of plies in a specific product. Although the manufacture of sheets and films is well known, their construction has generally involved the use of multi-manifold dies, each manifold being fed by an extruder. Multi-manifold systems are extremely costly to manufacture and they are difficult to operate requiring complicated, time-consuming adjustments. Although they can tolerate a difference in viscosities between molten layers of 10:1, their use is generally limited to the coextrusion of two or three layers.

Another system involves the use of a complex die or adaptor wherein a plurality of materials are combined for passage through an unconventional extrusion die. While the complex die system can be less costly than some multi-manifold systems and it can be employed to coextrude almost any number of layers desired, the flow of materials is not streamlined and, therefore, it cannot handle as wide a range of different materials. Generally, the maximum range of viscosities that can be tolerated is only 4:1. Thus, while either system can produce good films and sheets, they are either costly, requiring difficult and expensive machining, and they are difficult to maintain or, flow passages are not streamlined.

BACKGROUND ART

One known system for producing coextrusions involves the injection of at least one extrudate onto or into a moving stream of another extrudate both of which then pass to a suitable sheet forming extrusion die. U.S. Pat. No. 3,959,431 provides such an apparatus, employing a rod extruder, an adaptor with a lateral feed tube and, a sheet extrusion die. The adaptor carries an introducing means in its center forming an apex. An extruded rod of material is fed through the adaptor and is split internally as it passes around the apex of the introducing means. It is at this point that a second extrudate, fed through the introducing means, is injected into the center of the first extrudate. Design of the introducing means is such that the second extrudate extends across the flow path of the first. By employing several such introducing means, multiple extrudates can be combined.

The coextrusion of materials through the foregoing apparatus is never streamlined nor, is a balanced flow across the extruded sheet ever achieved. Also, the leading polymer must re-knit i.e., join together without a line of demarcation after splitting to flow around the introducing means. Re-knitting is a major problem whenever polymers of dissimilar viscosity are employed, thereby limiting the usefulness and applicability of the apparatus.

U.S. Pat. No. 3,959,432 discloses a process for the manufacture of composite sheeting having a layer of polystyrene and at least one layer of polycarbonate. The apparatus employed provides for the extrusion of molten polystyrene forming a rod. A minor stream of molten polycarbonate is fed into the polystyrene conduit near the top after which both polymer layers pass through a conventional sheet forming die. Introduction near the top of the conduit is also a provision of U.S. Pat. No. 3,959,431. This system does not provide for the coextrusion of materials having dissimilar melt temperatures and viscosities.

U.S. Pat. No. 3,833,704 provides a similar technique which employs an adaptor to extrude a thin layer of one extrudate upon a portion of the circumference of a rod of a second extrudate. Multiple layers are provided by the addition of other adaptors which can be positioned to extrude onto the rod of second extrudate as well as onto previously extruded layers. Coextrusion of materials having dissimilar melt temperatures and viscosities would not be practical.

U.S. Pat. No. 3,479,425 is somewhat similar to U.S. Pat. No. 3,959,431 in that it provides a slot die, having a rectangular orifice, which introduces an extrudate into a larger flowing body of different extrudate. Multiple slot dies can be employed for additional layers and, if desired, dies having a circular orifice can be substituted forming one or more concentric layers within the larger extrudate body. This method and apparatus suffers many of the problems already stated including non-streamlined flow, lack of balanced flow across the extruded sheet and necessity of re-knitting.

Another known system for producing coextrusions, particularly where multilayer products of two or more materials are desired, provides a plurality of adjacent streams of the materials in alternate and contiguous arrangement. U.S. Pat. No. 3,557,265 is directed toward such a system and employs a manifold having a distribution block which, in its simplist form, divides two streams of material such as a nonexpandable and an expandable resinous material into from about five to 1000 alternate, contiguous layers. The layers emerge from the distribution block and manifold into a transition piece which flattens them to a sheet configuration.

This system requires a very costly manifold and despite its complexity, it does not streamline the flow of materials to the extrusion opening. Lack of streamlining will give rise to stagnation. Thermally sensitive polymers degrade with excess time and temperature both of which occur with stagnation. Moreover, when corrosive polymers degrade, such as those containing chlorine, damage occurs to unprotected metal surfaces such as in the manifold, distributor block and transition piece of the apparatus. Stagnation of non-corrosive polymers gives rise to commercially unacceptable products, inasmuch as the degraded polymer, usually discolored, slowly dissolves into the molten undegraded flow and appears in the product. Intricacy of the passageways in the apparatus also increases the difficulty of cleaning and other maintenance. Another shortcoming of the system is that a costly transition piece must be substituted for extrusion of different sheet widths.

While each of the foregoing patents provides a usable system for coextruding certain polymeric materials, the volummetric amount of one layer with respect to another as well as its juxtaposition is not readily changed. Changeover for different numbers of layers involves substitution of equally costly elements. Also, if a polymer degrades giving off gasses, safe pressures for the system can be exceeded causing damage to the equipment and possibly the operator.

DISCLOSURE OF THE INVENTION

It is therefore an object of the present invention to provide a novel coextrusion device for use with conventional extruders and single, unmodified commercially available extrusion dies for forming profiles as well as flat, layered sheets and films from at least two materials.

It is another object of the present invention to provide a novel coextrusion device as above to provide sheets and films having at least two layers and as many as about 12.

It is yet another object of the present invention to provide a novel coextrusion device as above which can be employed to provide a uniform film or sheet, having uniform layers free from distortion or pinholes, where a given layer can comprise as little as about one percent of the thickness of the film or sheet.

It is still another object of the present invention to provide a novel coextrusion device as above which is relatively easy to manufacture and service and is less expensive than existing systems.

It is a further object of the present invention to provide a novel coextrusion device as above with which it is readily possible to change the numbers of layers and the thickness thereof without large capital expenditures for complex equipment.

It is a still further object of the present invention to provide a novel coextrusion device as above which can handle heat and shear sensitive materials particularly in the two outside layers.

It is another object of the present invention to provide a novel coextrusion device as above which provides a streamlined flow of materials to the extrusion die, thereby eliminating dead spots, i.e., zero velocity flow, within the device.

It is another object of the present invention to provide a novel coextrusion device as above which provides optimum shear balance.

It is another object of the present invention to provide a novel coextrusion device as above which, with an additional element, permits reversals of the stack orientation.

It is another object of the present invention to provide a novel coextrusion as above which reduces perturbation.

It is yet another object of the present invention to provide a method for reducing perturbation while coextruding layered products from at least a first and a second material, the materials being dissimilar in relative volumes, or viscosities or both.

These and other objects, together with the advantages thereof over known apparatus, which shall become apparent from the specification which follows, are accomplished by the invention as hereinafter described and claimed.

The coextrusion device of the present invention can be used with conventional extruders and extrusion dies for forming layered products from at least two materials. The device is operable in extrusion systems that produce flat articles such as films and sheets as well as profiled articles. In general it includes a manifold for receiving a plurality of extruded feed materials and a feedblock which receives the plurality of feed materials from the manifold. The feedblock includes first and second faces, entrance ports in the first face corresponding to the number of feed materials, channel means passing through the feedblock between the first and second faces directing each feed material into at least one separate profile and exit ports in the rear face corresponding to the number of channel means, defining a first profile for each said feed material. An adaptor is also provided for receiving the first profiles from the feedblock. It includes first and second faces, an entrance port in the first face receiving the first profiles, an exit port in the second face corresponding to the entrance of an extrusion die, and a transition zone between the entrance and exit ports wherein the first profiles become contiguous and the overall configuration of the contiguous first profiles is adapted for receipt by an extrusion die. By modifying the exit ports of the feedblock and the ports of the adaptor, various profiles can also be extruded.

A similar coextrusion device is also provided wherein the feedblock carries a fin in at least one of its channels which acts to reduce perturbation. A reverser element can also be employed between the manifold and feedblock for directing materials from the manifold to different ports in the feedblock than when the reverser element is not present. Use of the reverser element obviates the need to empty extruders and change the feed materials when a different stack configuration is required for a particular product. The reverser element can be employed with any of the feedblocks disclosed herein. A complete coextrusion system is also provided for wherein the foregoing device of the present invention is employed in combination with conventional extruders and an extrusion die.

A method is also provided by the present invention for reducing perturbation while coextruding layered products from at least a first and second material, where the materials are dissimilar in relative volumes, or viscosities, or both. The method includes the steps of feeding the first and second feed materials to a coextrusion device having a manifold, a feedblock and an adaptor, reducing the area of the first and second feed material within the feedblock, forming at least one separate profile for the first and second material within the feedblock, and, dividing a portion of the second material into two separate profiles, a major profile having substantially more than half of the second material and a minor profile having substantially less than half of the second material wherein the minor profile is oriented between the profile of the first material and the major profile and each of the profiles are maintained separate from the others. The method continues with the steps of combining the profile of the first material with the minor profile and with the major profile within the adaptor, providing a streamlined configuration of the first and second feed materials within the adaptor for mating with a conventional extrusion die and, coextruding the layered product through the die.

BRIEF DESCRIPTION OF THE DRAWINGS

FIG. 5 is an end view of the feedblock taken substantially along the line 5—5 of FIG. 3 and depicting three entrance ports;

FIGS. 5A–C are fragment views of FIG. 5 depicting three separate passageways, partially hidden, for each of three separate extruded feed materials;

FIG. 6 is an end view of the feedblock, taken substantially along the line 6—6 of FIG. 3;

FIG. 6A is a fragment view of FIG. 6 depicting three extruded feed materials in separate adjacent profiles as they emerge from the feedblock;

FIG. 7 is an end view of the adaptor plate taken substantially along the line 7—7 of FIG. 3;

FIG. 7A is a cross-section of the adaptor taken substantially along the line 7—7 of FIG. 3;

FIG. 8 is a perspective view of the feedblock depicting the entrance ports;

FIG. 17 is a side elevation of an alternate feedblock for reducing perturbation; and FIG. 18 is a fragment view of FIG. 17, taken in the direction of the arrows 18—18, and depicting the exit ports in the rear face of the alternate feedblock.

PREFERRED MODE FOR CARRYING OUT THE INVENTION

Figure 1:
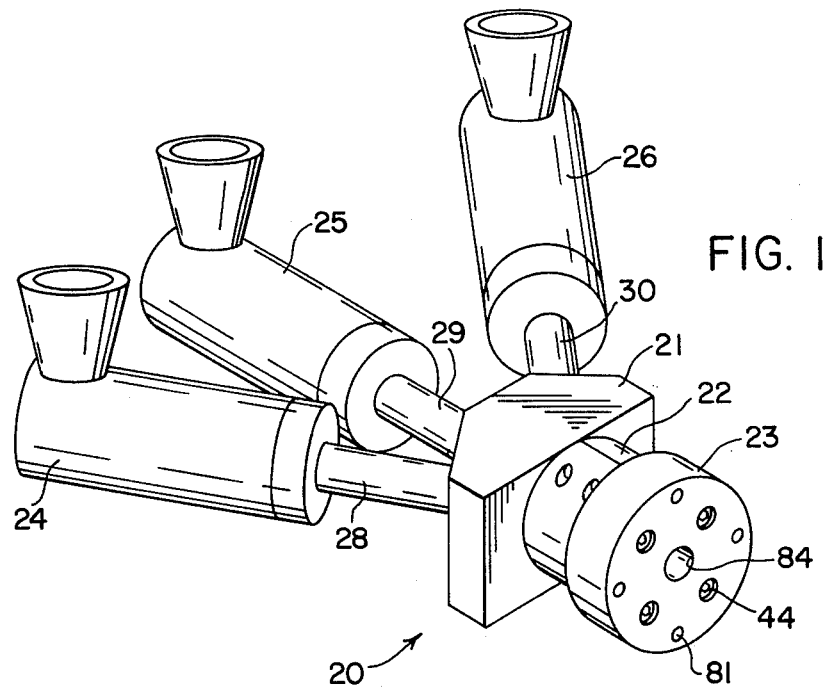
FIG. 1 is a perspective view schematically depicting three conventional extruders and the coextrusion device of the present invention.

The coextrusion device of the present invention can be utilized for the production of various films, sheets and profiles from materials such as polyolefins, polyvinyl chloride (PVC), polyvinylidene chloride (Saran), nylon, polycarbonate, polystryene and copolymers such as acrylonitrile-butadiene-styrene (ABS), styrene-acrylonitrile (SAN) and Barex. Barex is a registered trademark of Vistron Corporation for barrier resins. Barex 210, an acrylonitrile-methylacrylate-rubber copolymer has particular utility as food packaging in both sheet and film forms inasmuch as it is clear, shatter resistant, offers a barrier to gasses, protects from oxidation, has no odor or taste transfer, resists food oils and solvents and provides negligible loss of aromas and flavors. It can be coextruded with plastics such as polyethylene or other polyolefins with a suitable adhesive therebetween with the coextrusion device of the present invention. As will be evident, the present invention will find utility with any of the existing resins as well as with resins that may be developed for use in extrusion processes and therefore use of the device should not be limited to any particular plastic. Moreover, extrusion of various plastics through dies to form films, sheets, profiles and the like is also known and it is intended that the coextrusion device set forth herein can be utilized in existing extrusion systems.

The coextrusion device of the present invention increases the utility of existing extrusion systems by enabling them to employ polymers heretofore impossible to coextrude. While such polymers are extrudable, they are shear and thermally sensitive and, therefore, cannot tolerate either abrupt changes in velocity flow, or zero flow, e.g., areas of stagnation. In order to avoid these conditions, streamlined passages are necessitated as is minimum residence time while they are in the molten state. Characteristic polymers of this type are those which are thermally degradable such as Barex, Saran, PVC, ABS and SAN.

Other polymers that have been successfully coextruded heretofore, such as the polyolefins, polystyrene, polycarbonates and the like, will provide better products when the coextrusion device of the present invention is employed in the coextrusion system. This is primarily attributable to the structure of the device which provides for greater precision in the extruded layers forming the extruded product. Changing the number of layers and the ratio of thicknesses is easily facilitated without changing a complex extrusion die or multimanifold. Moreover, changing the width of the extruded product, requires the substitution of only a conventional extrusion die. Furthermore, an optional embodiment of the present invention permits reversals of the stack orientation with relative ease, heretofore a costly and time-consuming procedure. Yet another embodiment minimizes perturbation allowing materials of dissimilar viscosity and/or great volume differences e.g., a 60 percent layer adjacent a 10 percent layer, to be coextruded.

With respect to the drawings, the coextrusion device of the present invention is designated generally by the numeral 20 and basically comprises the manifold 21, feedblock 22 and adaptor plate 23. It is depicted in FIG. 1 with three conventional extruders 24, 25 and 26 each of which is provided with a suitable conduit 28, 29 and 30, respectively, to feed extruded materials to the manifold 21. For purposes of explanation, the extrusion device 20 described herein is operable with a feed of three materials. This arrangement will provide for the extrusion of two identical polymers, which could have the same or different colors, such as from extruders 24 and 26 and a separate different polymer from extruder 25, or three different polymers one each from an extruder, or two different polymers from extruders 24 and 25 and a suitable adhesive or glue material from extruder 26. It is to be understood that only two or as many as about 12 extruders could be employed, in which instance each would feed into the manifold 21 of the device 20.

Figure 2:
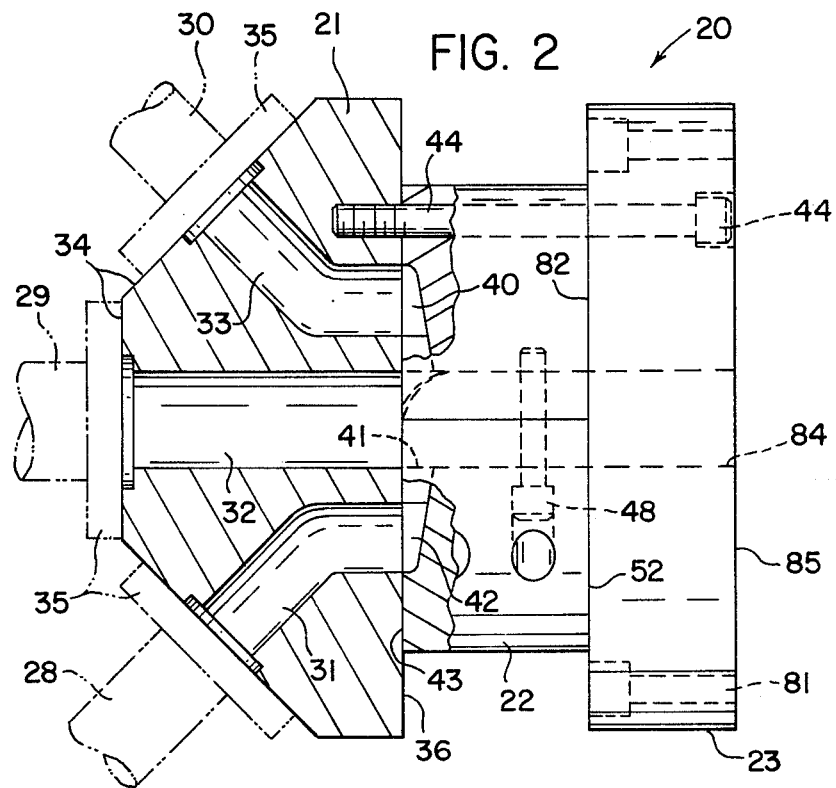
FIG. 2 is a plan view of the coextrusion device of the present invention.
Figure 4:
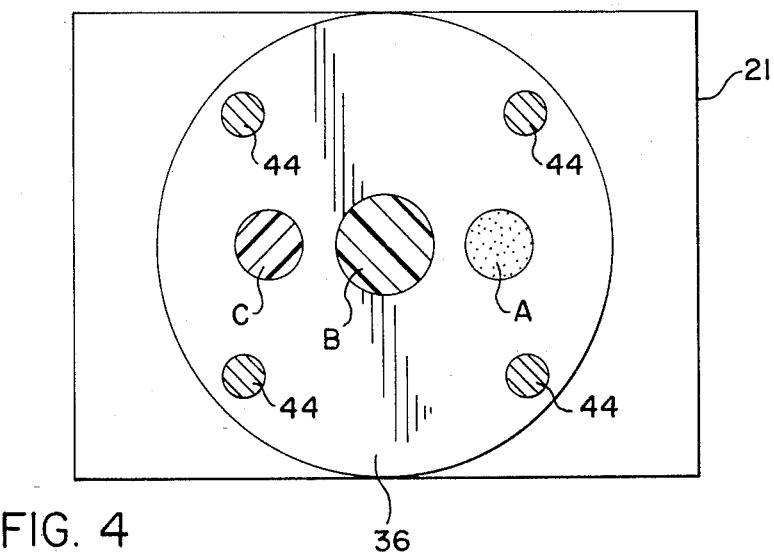
FIG. 4 is an end view of the manifold, taken substantially along the line 4—4 of FIG. 3.

The manifold 21, clearly depicted in FIG. 2, is a metal element having a number of separate passageways 31, 32 and 33 corresponding to the number of feed materials provided via the conduits 28–30 respectively which can be connected to the manifold face 34 in a conventional manner, depicted in phantom as at 35. Exit of the three separate feed materials A, B and C from the rear face 36 of manifold 21 is depicted in FIG. 4.

As is evident from the drawing, all three passageways provide maximum streamlining and are relatively short, readily facilitating cleaning. The passageway 32 is particularly useful because it provides a straight feed of material which, as will be seen hereinbelow, passes directly through the feedblock 22 and adaptor 23 with minimal restrictions other than those designed to create a desired back pressure. Such configuration enables the operator to feed a polymer, particularly sensitive to heat degradation, through the device 20. In many existing devices, passageways have an intricate configuration wherein gasses, formed by degrading polymers, cause excess pressures that can cause the rupture of the die or other apparatus.

Feed materials A, B and C pass directly into the entrance ports 40, 41 and 42 respectively, provided at the front face 43 of feedblock 22 (FIG. 5). As depicted in FIGS. 3–6 the faces 36 and 43 of manifold 21 and feedblock 22 mate and are held together suitably as by cap screws 44.

The feedblock 22 is generally cylindrical and is also a metal element, preferably constructed in two halves 45 and 46 held together with cap screws 48. Construction in this manner facilitates machining as well as cleaning and other maintenance during use. The purpose of feedblock 22 is to bring all of the feed materials A, B and C into adjacent separate first profiles in a stack orientation similar to that which they will bear in the finished product. Additionally, the feedblock modifies the flow of each stream such that it becomes streamlined and shear balanced relative to the other streams which are themselves streamlined and shear balanced. This is accomplished by the design of the individual passageways through the feedblock which passageways reduce the cross-sectional area of the flow streams according to the mass flow anticipated therefor. It is to be noted that the materials A, B and C remain separated from each other during their passage through the feedblock 22.

With reference to FIGS. 5, 5A–C, 6, 6A, 8 and 9, the individual means or channels, by which the feed materials pass through feedblock 22, are depicted. Feed material B, which enters port 41 of the feedblock, passes directly through a channel indicated generally by the numeral 50. The channel 50 is provided in the halves 45 and 46 and passes the material B to exit port 51 in feedblock 22. The port 51 is clearly depicted in FIG. 6 at the rear face 52 of feedblock 22.

Figure 3:
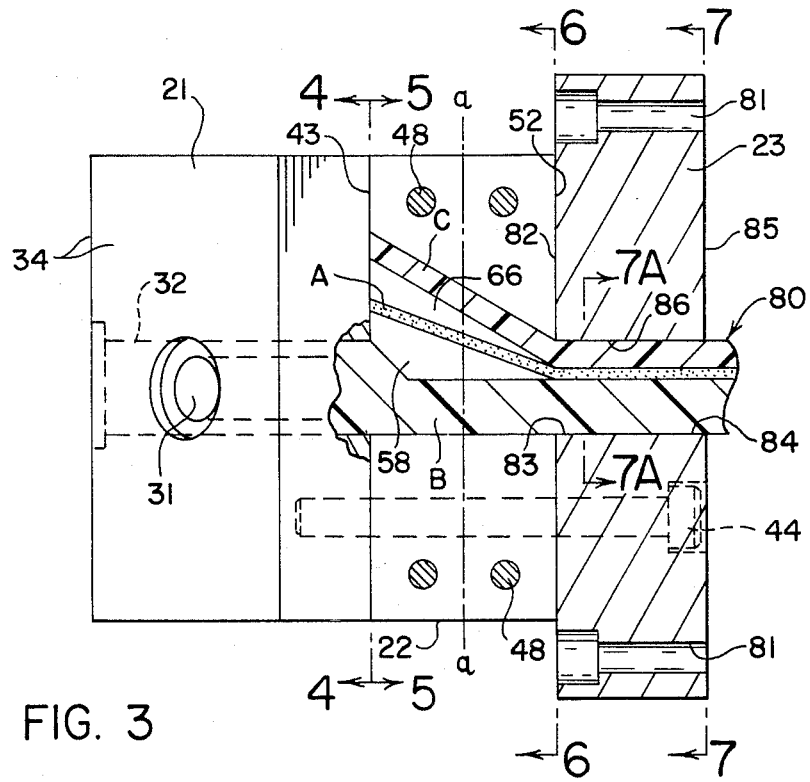
FIG. 3 is a side elevation of the coextrusion device of the present invention, partially in section.

More specifically, the channel 50 comprises two sections 53 and 54. Section 53 is a transition zone or preland wherein the cross-sectional area of the feed material B is reduced and the configuration thereof is altered. In order to maintain a streamlined flow, the reduction in area is achieved gradually and continuously as opposed to stepwise or abruptly. Similarly, the velocity change must be as minimal as possible, maximizing the streamlining of the zone 53. Generally, the area reduction is at least ten percent, based upon the cross-sectional area of the feed material as it emerges from the manifold. Area reduction is, however, dependent upon the volume of feed material desired to exit from the feedblock port 51, therefore where more than ten percent volume reduction is desired, the depth of the transistion zone into the feedblock can be increased and correspondingly, a greater volume of the feedblock is utilized for the zone 53.

Where transition zone 53 terminates, section 54, the land begins. Throughout its length, the cross-sectional area of the feed material B remains constant, that is, the area at the exit port 51 is identical to the area finally determined by the transition zone 53. Purpose of the land 54 being to provide the longest stable history for the feed material flow, the land extends through more than 50 percent of the thickness of the feedblock 22. With reference to FIG. 3, a plane $\alpha$ passing parallel to and equidistant from the feedblock faces 43 and 52 will intersect the land 54. The transition zone 53, on the other hand, will be totally to the left of the plane $\alpha$, as viewed in FIG. 3. As will be appreciated by those skilled in the art the rectangular cross-section of the land 54 should blend smoothly with the non-rectangular cross-section of the transition zone 53, all corners being radiused insofar as is possible to insure streamlining.

Figure 9:
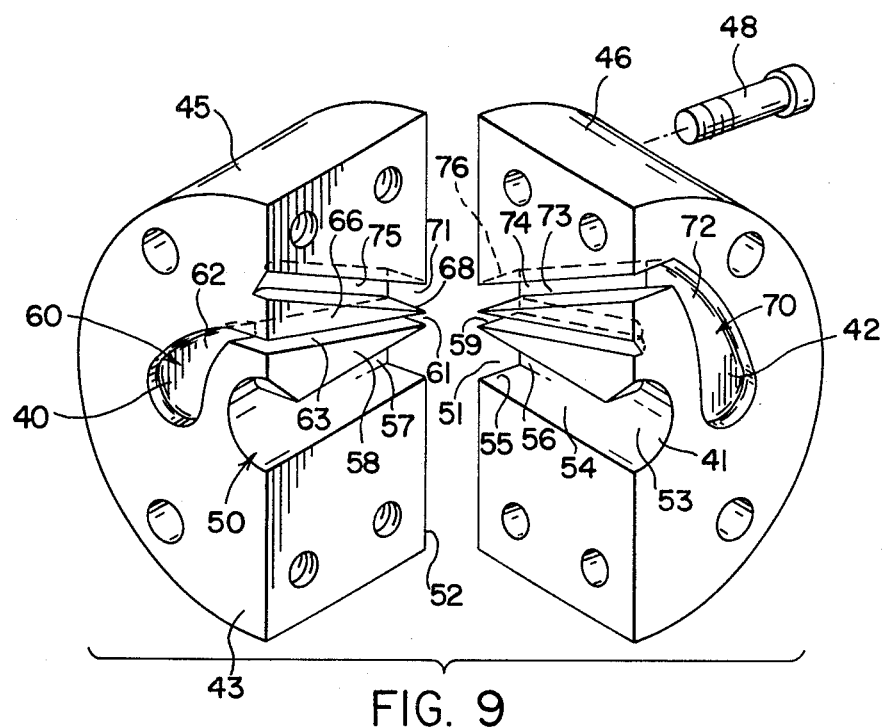
FIG. 9 is an exploded perspective view of the feedblock depicting three separate passageways therethrough.

At the end of the land 54, is the exit port 51 which, as viewed in FIG. 6, is generally rectangular. The profile is determined by the walls of the land which include a bottom wall 55, sidewalls 56 and 57, and a first medial wall 58, forming the upper wall. As depicted in FIGS. 6 and 9, the first medial wall 58 is tapered to a sharp edge 59 which lies in the plane of the rear face 52. The edge 59 maintains a line of separation between the feed material B and the next adjacent layer A.

Similarly, feed material A, enters port 40, passes through a channel indicated generally by the numeral 60 and exits via port 61 at the rear side of feedblock 22. As depicted most clearly in FIG. 9, the channel 60 comprises a transition zone 62 and a land 63. The transition zone 62 begins laterally disposed from entrance port 41 and passes upwardly and through approximately one quarter turn at which point the land 63 begins, which in turn passes the material A to the exit port 61. As is the design of the channel 50, the channel 60 is carried by the two halves 45 and 46. Similarly, land 63 is intersected by the plane $\alpha$ while the transition zone 62 is carried by that portion of the feedblock left of the plane $\alpha$, as viewed in FIG. 3.

The exit profile of the material A, which appears generally rectangular, is defined between the first medial wall 58, forming the bottom, sidewalls 64 and 65 and a second medial wall 66. The second medial wall 66 is also tapered to a sharp edge 68, similar to the design of the first medial wall 58 and its edge 59. The edge 68 also lies in the plane of the rear face 52 and maintains a line of separation between the feed material A and the next adjacent layer C.

Lastly, feed material C, enters port 42, passes through a channel indicated generally by the numeral 70 and exits via port 71 at the rear of feedblock 22. The channel 70 comprises a transition zone 72 and a land 73. The transition zone 72 begins laterally disposed from entrance port 42 and passes upwardly, through approximately one quarter turn at which point the land 73 begins, which in turn passes the material C to the exit port 71. The exit profile of the material C, which appears generally rectangular, is defined between the second medial wall 66, forming the bottom, sidewalls 74 and 75 and an upper wall 76. Similar to the other channels, channel 70 is carried by the two halves 45 and 46; the land 73 is intersected by the plane $\alpha$ and, the transition zone 72 is carried by that portion of the feedblock left of plane $\alpha$.

The combined configuration of the exit ports 51, 61 and 71 is generally square, as indicated by the numeral 78 in FIGS. 6 and 6A with the layers A and B being separated by the edge 59 and the layers A and C being separated by the edge 68 at the face 52. The configuration of the exit ports 51, 61 and 71 is also such that the dimensions between sidewalls 56-57, 64-65, and 74-75 is equal in order to obtain an equal width of each of the layers A, B and C in the finished sheet. The tapered first and second medial walls 58 and 66 gradually bring the feed materials B, A and C together in a streamlined manner. Further streamlining is provided by having the materials separated by only the edges 59 and 68 just before they emerge from the feedblock 22. Similarly, a feedblock for another number of feed material layers should maintain each layer separate from adjacent layers by an edge such as 59 or 68 prior to emergence therefrom in order to maintain streamlining.

The relative thickness of each layer or quantity thereof in the sheet is determined by the thickness of each respective exit port 51, 61 and 71. Thus, while not necessarily to scale, assuming the volume ratio of the feed materials C, A and B, depicted in FIG. 6A is 30%, 10% and 60%, respectively, a very similar thickness ratio will be obtained in the extruded sheet. The volume of the feed materials can be changed plus or minus approximately ten percent by varying the feed rate of the respective extruders so long as a layer is not less than about one percent of the total volume and the total of all layers equals 100 percent. If a considerable difference in ratio between the same three materials be desired, one need only interchange a different feedblock having three channels and different volume exit ports.

Although from two to 12 feed materials can be passed through an equal number of channels, providing many different thickness ratios of individual layers, a volummetric amount of most materials of at least five percent is believed to be necessary in order to prevent voids from developing as the feed materials pass through the conventional extrusion die. This is generally true where the polymers are different and have dissimilar viscosities. However, where the layers have similar viscosities or even the same, as when different colors of the same polymer are extruded and, the layers will be contiguous, a volummetric amount as low as one percent can be employed.

Having exited the feedblock in a generally square configuration, the feed materials are converted to a flow having a circular cross-section, as depicted by the numeral 80 (FIG. 3), in which form they can be fed directly to an unmodified commercially available extrusion die. To perform the conversion the adaptor 23, also metal, is employed. The adaptor 23 has a larger diameter than the feedblock 22 so that an extrusion die can be connected thereto with screws through the holes 81. The front wall 82 of adaptor 23 mates with the rear of feedblock 22 and is connected thereto via screws 44. It carries a generally square entrance port 83, depicted in phantom in FIG. 7, and a circular exit port 84 at its rear wall 85.

Between the ports 83 and 84 is a final transition zone 86 wherein the individual layers become contiguous as is depicted in FIG. 7A. Also as seen in the drawing, the profiles are changed to a configuration that will mate with the entrance of the extrusion die being employed. Generally, the entrance of the extrusion die will be circular although the adaptor could be machined to provide any other cross-section suitable for a specific extrusion die. Irrespective of the exit profile, it is desirable that the configuration e.g., circular, be imparted to the feed materials within the first half of the transition zone 86 so that the configuration remains fixed as it passes through the second half thereof.

Figure 10:
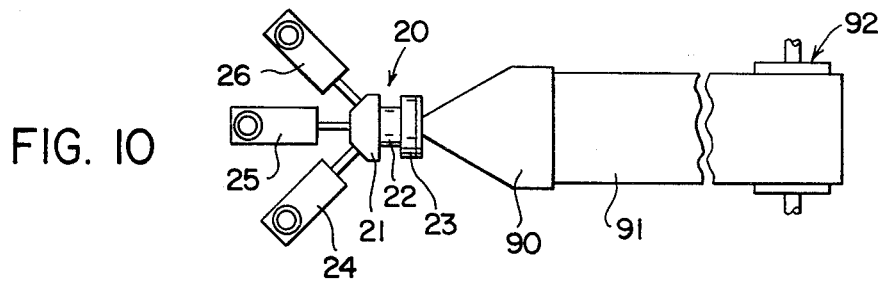
FIG. 10 is a schematic plan view of a coextrusion system.

As stated hereinabove, the coextrusion device 20 can be employed in an otherwise conventional film or sheet extrusion system, the latter being depicted schematically in FIG. 10 which includes extruders 24-26, an extrusion die 90, and suitable means for drawing and/or cooling the product 91 from the system as indicated generally by the numeral 92. It should be apparent that the device 20 can be employed for the extrusion of films, via suitable apparatus, not shown, typically having a thickness of less than 10 mils (0.25 mm), and sheets, typically having a thickness of more than 10 mils (0.25 mm).

For the extrusion of profiles, the device 20 can be employed having the configuration disclosed hereinabove or certain modifications can be made that will favor the arrangement of different materials in configurations other than as depicted in FIGS. 6-6A. While no attempt shall be made to depict all such possibilities, the general idea can be understood by referring to FIGS. 11-13.

Figures 11, 12, 13:
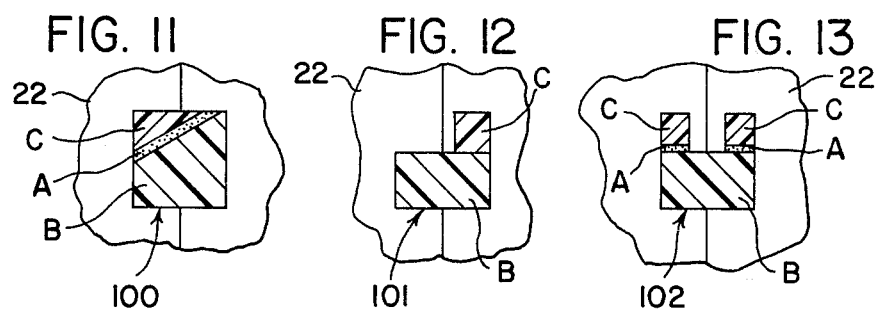
FIGS. 11–13 are fragment views, similar to FIG. 6A, depicting alternate feedblock exit ports and extruded feed materials as they emerge therefrom.

Each figure provides the configuration of exit ports for materials A, B and C from different feedblocks. FIG. 11 depicts a modified feedblock 22 wherein a layer of material C is available for the extrusion of a lateral side or edge of polymer, different from the base polymer B. A layer of adhesive A is optionally present. The exit profile of the layers, indicated generally by the numeral 100, is also square. In FIG. 12 a different exit profile is depicted, indicated by the numeral 101, which provides a smaller layer of material C for a small flange. The feed material C does not extend totally across the underlying layer B and is formed in a correspondingly smaller transition zone than zone 72 of FIG. 9. For the extrusion of a channel, having opposed flanges different than the base, a feedblock having the exit profile 102 depicted in FIG. 13 can be employed which provides a continuous base material B, a discontinuous second layer C and a discontinuous adhesive layer A therebetween. As in the instance of FIG. 12, smaller transition zones are employed to provide the layers C and A. In order to provide the discontinuity in the layers C and A, five separate feeds are employed, one for the material B and two each for the materials C and A. The feed materials from each of these feedblocks can be fed through a suitable adaptor plate and to a conventional profile extruder die. As stated hereinabove, the adaptor will alter the exit profile from the feedblock to one suitable for entrance into the extruder die.

Occasionally, it is necessary, or at least desirable to alter the stack configuration, although the same materials are being fed and the relative volumes of various layers in the final product are to remain the same. For instance, with reference to FIGS. 6A and 10, depicting the device 20 discussed hereinabove, the configuration of the layers A, B and C is such that B, the largest volume material is oriented at the bottom of the stack while the material C is at the top. If it were desired to change the orientation such that material C were at the bottom of the stack, at approximately 60 percent volume and, material B were at the top, at approximately 30 percent volume, either the feed of the extruders 25 and 24 should be reversed or a different feedblock substituted.

Figure 14:
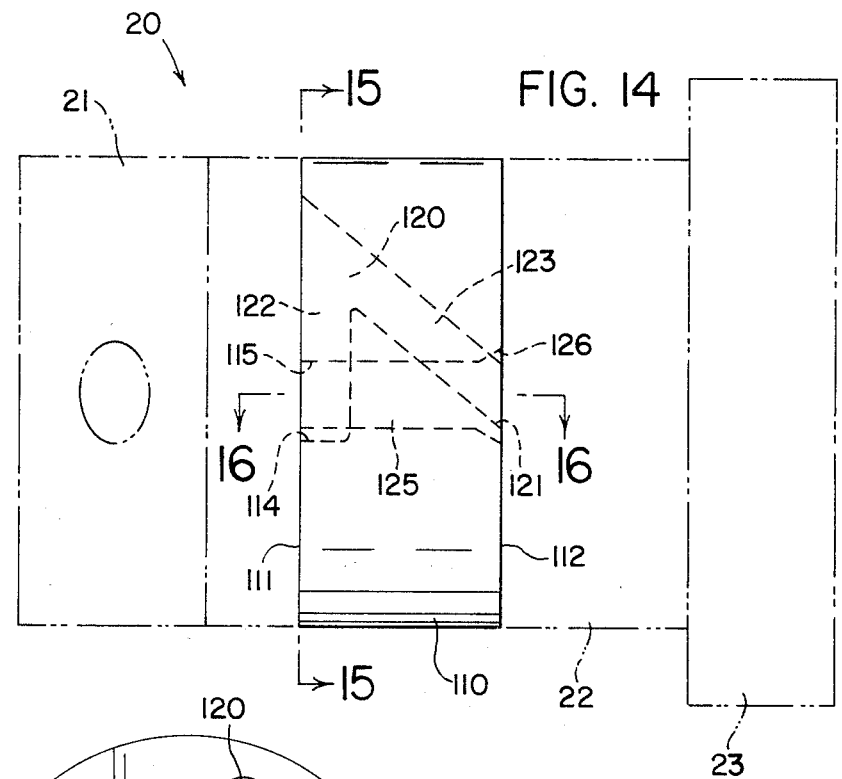
FIG. 14 is a side elevation, similar to FIG. 3, depicting the device of the present invention in phantom and a fourth element, a reverser, utilized therewith.
Figure 15:
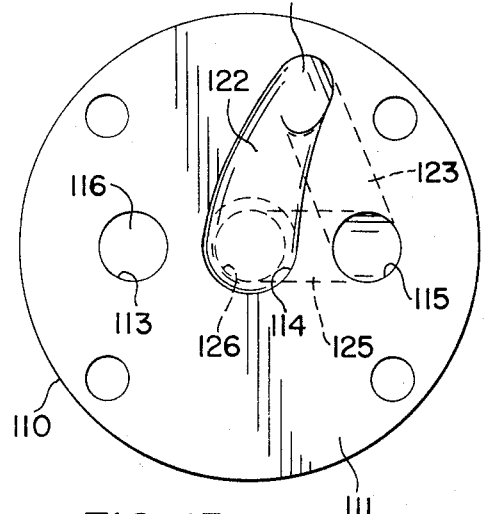
FIG. 15 is an end view of the reverser taken substantially along the line 15—15 of FIG. 14 and depicting three entrance ports.
Figure 16:
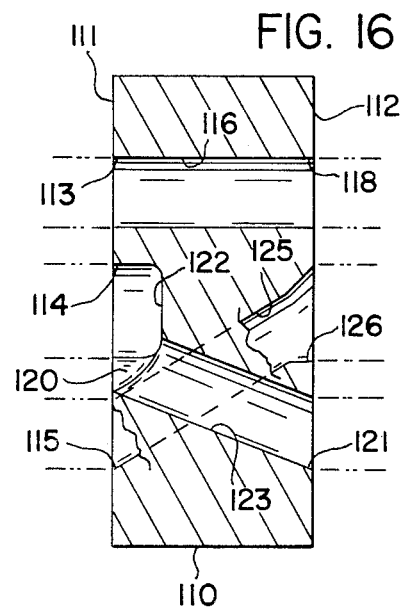
FIG. 16 is a cross-section of the reverser in side elevation, depicting three separate channels.

In order to avoid either of these steps, a fourth separate element, a reverser 110, can be employed. The reverser 110, depicted in FIGS. 14-16, comprises a metal element having front and rear faces 111 and 112 and is positioned between the manifold 21 and feedblock 22, being connected thereto by the screws 44. The inverter is provided with three entrance ports 113, 114 and 115. The first port 113 receives the material A from extruder 26, which is passed straight through a channel 116 and through an exit port 118 directly into the entrance port 40 of feedblock 22.

The second port 114 receives the material B from extruder 25 which is passed through a channel 120 and through an exit port 121 directly into entrance port 42 of feedblock 22, which would have ordinarily received the material C directly from the manifold 21. The channel 120 passes upwardly through a first section 122 and down a second section 123 which presents the material therein to entrance port 42. It will be noted that the original feed from the passageway 32 in manifold 21 was of a larger diameter than will now be received by the entrance port 42. Accordingly, the cross-sectional area of the feed material B is reduced in the first section of the channel 120.

The third port 115 receives the material C from extruder 24 which is passed through a channel 125 and through an exit port 126 directly into the entrance port 41 of feedblock 22, which would have ordinarily received the material B directly from the manifold 21. The channel passes angularly to the center of the reverser 110 and it is to be noted that the port 126 is flared out so that a larger diameter feed flow is provided the entrance port 41.

A further embodiment of the device 20 is depicted in FIGS. 17 and 18 wherein a modified feedblock or diverter feedblock 130 is employed. The diverter feedblock 130 is similar in construction to the feedblock 22 and comprises two halves 131 and 132 and front and rear faces 133 and 134. Entrance ports 135, 136 and 137 are provided at the front face 133 as are exit ports 138, 139 and 140 at the rear face 134. Separate channels indicated by the numerals 141, 142 and 143 are also provided between the respective ports and, inasmuch as each includes a transition zone or preland and a land, as discussed for the feedblock 22, a detailed explanation thereof has not been included for all of the channels.

Of the three channels, channel 141 does bear discussion. Channel 141 includes a transition zone 144 and a land 145 for passage of the material B (not shown) directly from the manifold 21. The difference of channel 141 from the others 142 and 143, as well as its counterpart in feedblock 22, channel 50, is that the land 145 is provided with a thin metal fin 146. The fin 146 is carried between the sidewalls 148 and 149 of the land 145, is parallel with the bottom and top walls thereof 150 and 151, respectively, and extends the length thereof.

Its purpose is to divide the flow of material therein into two adjacent layers, an upper or minor layer having a volume of substantially less than 50 percent e.g., about 16 percent, and a lower or major layer having a volume of substantially more than 50 percent e.g., about 84 percent. For a layer originally comprising a volume of 60 percent of the coextruded materials, the minor layer will provide ten percent and the major layer will provide 50 percent of the volume of the three materials. Accordingly, the area of the exit port 138 is reduced and separate exit ports 152 (minor) and 153 (major) are provided. More specifically, the fin 146 acts to minimize, if not eliminate, perturbation between the next adjacent layer, the A material as depicted in FIG. 6A and the lower layer. Perturbation occurs between layers such as A and B where the volume ratio difference is great such as 60 to 90 percent against ten percent or, the viscosity difference between adjacent layers is high e.g., about 3:1 and higher, or both. Because of perturbation, the uniformity of layer A in the final product can be disturbed.

When the layers emerge from the feedblock 130, and enter the adaptor 23, the ten percent layer (A) from exit port 139 becomes contiguous with another ten percent layer of a different material (B) from exit port 152. This second ten percent layer of material is contacted on its other side by a larger volume of the same material (B) from exit port 153 and, inasmuch as the two layers are of the same viscosity and the volume differences are not too great, no perturbation occurs therebetween.

Thus, the fin 146 makes adjacent layers of different viscosities compatible. Although not so depicted, a fin could be oriented vertically within a land rather than horizontally such as might be desirable in profile extrusion. Whatever its orientation the fin should be located exclusively within the land, it must be smooth to aid streamlining and as thin as possible so long as it can withstand the flow of extruded material passing around it.

As stated hereinabove, the feedblock 130 is otherwise identical to the feedblock 22, that is, the two other materials A and C will flow through it in the same manner. Therefore, it will be evident that the feedblock 130 is substituted in the device 20 for the feedblock 22 and, that the former can also be employed with the reverser 110. Furthermore, a suitably designed feedblock 130 can also accommodate a different number of feeds ranging again from at least two to about 12 and, it is conceivable that more than one fin could be employed therein.

Thus, it can be seen that the disclosed invention carries out the objects set forth hereinabove. By employing a coextrusion device as described herein with a conventional extrusion system, uniform layered products can be readily obtained. Owing to the relative simplicity of the device set forth herein, it is evident that its manufacture will be less costly than existing systems where more intricate die feeding assemblies are used. As will be apparent to those skilled in the art, a variety of plastic products can be made in an extrusion system utilizing one of the coextrusion devices described herein or a modification thereof to incorporate less or more layers. Such variations can be determined without departing from the spirit of the invention herein disclosed and described. Moreover, the scope of the invention shall include all modifications and variations that fall within the scope of the attached claims.

What is claimed is:

1. A coextrusion device, for use with conventional extruders and extrusion dies for forming layered products from at least two materials, comprising:
    manifold means for receiving a plurality of extruded feed materials wherein individual feed materials are directed into separate flow streams passing therethrough;
    feedblock means receiving said flow streams of feed materials from said manifold and maintaining each separate while passing therethrough;
    said feedblock having
        first and second faces;
        entrance ports in said first face corresponding to the number of said flow streams of feed materials;

channel means passing through said feedblock between said first and second faces reducing the cross-sectional area of each separate flow stream and directing each flow stream into at least one separate profile;

exit ports in said second face corresponding to the number of said channel means, defining a first profile for each said flow stream of feed material; and adaptor means receiving said first profiles from said feedblock said adaptor means having first and second faces;

an entrance port in said first face receiving said first profiles;

an exit port in said second face corresponding to the entrance of an extrusion die; and a transition zone between said entrance and exit ports wherein said first profiles become contiguous and the overall configuration of said contiguous first profiles is adapted for receipt by an extrusion die.

2. A coextrusion device, as set forth in claim 1, said manifold having a first exit port and said feedblock having a first entrance port for passage of a first feed material in a first flow stream; and said manifold having a second exit port and said feedblock having a second entrance port for passage of a second feed material in a second flow stream.

3. A coextrusion device, as set forth in claim 2, said device further comprising:

reverser plate means interposed between said manifold and said feedblock said reverser plate means having at least first and second entrance ports for said first and second feed material flow streams from said mainfold;

at least first and second exit ports for said first and second feed material flow streams to pass into said first and second entrance ports of said feedblock; and at least a first channel directing said first feed material flow stream to said second entrance port of said feedblock; and at least a second channel direction said second feed material flow stream to said first entrance port of said feedblock.

4. A coextrusion device, as set forth in claim 1, wherein said exit ports extend to the surface of said feedblock rear face maintaining said flow streams of feed materials passing therethrough distinct and separate from adjacent layers.

5. A coextrusion device, as set forth in claim 1, wherein said channel means includes a preland communicating with said entrance port; and a land communicating with said exit port and receiving said feed material from said preland.

6. A coextrusion device, as set forth in claim 5, wherein walls forming said preland are streamlined and configured to reduce the cross-sectional area of said flow stream of feed material therin to that of said exit port carried by said feedblock.

7. A coextrusion device, as set forth in claim 6, wherein walls forming said land are streamlined and configured to alter the configuration of said flow stream of feed material to that of said exit port carried by said feedblock.

8. A coextrusion device, for use with conventional extruders and extrusion dies for forming layered products from as least two different materials, comprising:

manifold means for receiving a plurality of extruded feed materials wherein individual feed materials are directed into separate flow streams passing therethrough;

feedblock means receiving said plurality of feed materials from said manifold and maintaining each separate while passing therethrough;

said feedblock having first and second faces;

entrance ports in said first face corresponding to the number of said flow streams of feed materials;

channel means passing through said feedblock between said first and second faces reducing the cross-sectional area of each said flow stream and directing each flow streams into at least one separate profile;

fin means provided in at least one of said channels dividing at least one said separate profile into two; and exit ports in said second face corresponding to the number of said separate profiles from said channel means, defining a first profile for each said separate profile; and adaptor means receiving said first profiles from said feedblock said adaptor means having first and second faces;

an entrance port in said first face receiving said first profiles;

an exit port in said second face corresponding to the entrance of an extrusion die; and a transition zone between said entrance and exit ports wherein said first profiles become contiguous and the overall configuration of said contiguous first profiles is adapted for receipt by an extrusion die.

9. A coextrusion device, as set forth in claim 8, wherein said exit ports extend to the surface of said feedblock rear face maintaining said flow streams of feed materials passing therethrough distinct and separate from adjacent layers.

10. A coextrusion device, as set forth in claim 8, said manifold having a first exit port and said feedblock having a first entrance port for passage of a first feed material in a first flow stream; and said manifold having a second exit port and said feedblock having a second entrance port for passage of a second feed material in a second flow stream.

11. A coextrusion device, as set forth in claim 10, said device further comprising:

reverser plate means interposed between said manifold and said feedblock;

said reverser plate means having at least first and second entrance ports for said first and second feed material flow streams from said manifold;

at least first and second exit ports for said first and second feed material flow streams to pass into said feedblock; and at least a first channel directing said first feed material flow stream to said second entrance port of said feedblock; and at least a second channel directing said second feed material flow stream to said first entrance port of said feedblock.

12. A coextrusion device, as set forth in claim 8, wherein said channel means includes
a preland communicating with said entrance port; and
a land communicating with said exit port and receiving said feed material from said preland.

13. A coextrusion device, as set forth in claim 12, wherein wall forming said preland are streamlined and configured to reduce the cross-sectional area of said flow stream of feed material therein to that of said exit port carried by said feedblock.

14. A coextrusion device, as set forth in claim 13, wherein walls forming said land are streamlined and configured to alter the configuration of said flow stream of feed material to that of said exit port carried by said feedblock.

15. A coextrusion device, as set forth in claim 14, said fin means being provided in said land.

16. An apparatus for forming layered products from at least two different materials, comprising in combination:
a plurality of extruders providing feed materials;
an extrusion die;
manifold means for receiving said feed materials from said extruders wherein individual feed materials are directed into separate flow streams passing therethrough;
feedblock means receiving said flow streams of feed materials from said manifold and maintaining each separate while passing therethrough;
said feedblock having
first and second faces;
entrance ports in said first face corresponding to the number of said flow streams of feed materials;
channel means passing through said feedblock between said first and second faces reducing the cross-sectional area of each separate flow stream and directing each flow stream into at least one separate profile;
exit ports in said second face corresponding to the number of said channel means, defining a first profile for each said flow stream of feed material; and
adaptor means receiving said first profiles from said feedblock
said adaptor means having
first and second faces;
an entrance port in said first face receiving said first profiles;
an exit port in said second face corresponding to the entrance of said extrusion die; and
a transition zone between said entrance and exit ports wherein said first profiles become contiguous and the overall configuration of said contiguous first profiles is adapted for receipt by said extrusion die.

17. An apparatus, as set forth in claim 16, wherein said exit ports extend to the surface of said feedblock rear face maintaining said flow streams of feed materials passing therethrough distinct and separate from adjacent layers.

18. An apparatus, as set forth in claim 16, said manifold having a first exit port and said feedblock having a first entrance port for passage of a first feed material in a first flow stream; and
said manifold having a second exit port and said feedblock having a second entrance port for passage of a second feed material in a second flow stream.

19. An apparatus, as set forth in claim 18, said system further comprising:
reverser plate means interposed between said manifold and said feedblock;
said reverser plate means having
at least first and second entrance ports for said first and second feed material flow streams from said manifold;
at least first and second exit ports for said first and second feed material flow streams to pass into said feedblock; and
at least a first channel directing said first feed material flow stream to said second entrance port of said feedblock; and
at least a second channel directing said second feed material flow stream to said first entrance port of said feedblock.

20. An apparatus, as set forth in claim 16, wherein said channel means includes
a preland communicating with said entrance port; and
a land communicating with said exit port and receiving said feed material from said preland.

21. An apparatus, as set forth in claim 20, wherein walls forming said preland are streamlined and configured to reduce the cross-sectional area of said flow stream of feed material therein to that of said exit port carried by said feedblock.

22. An apparatus, as set forth in claim 21, wherein walls forming said land are streamlined and configured to alter the configuration of said flow stream of feed material to that of said exit port carried by said feedblock.

23. An apparatus for forming layered products from at least two different materials, comprising in combination:
a plurality of extruders providing feed materials;
an extrusion die;
manifold means for receiving said feed materials from said extruders wherein individual feed materials are directed into separate flow streams passing therethrough;
feedblock means receiving said plurality of feed materials from said manifold and maintaining each separate while passing therethrough;
said feedblock having
first and second faces;
entrance ports in said first face corresponding to the number of said flow streams of feed materials;
channel means passing through said feedblock reducing the cross-sectional area of each said flow stream and between said first and second faces directing said flow streams into at least one separate profile;
fin means provided in at least one of said channels dividing at least one of said separate profiles into two; and
exit ports in said second face corresponding to the number of said separate profiles from said channel means, defining a first profile for each said separate profile; and adaptor means receiving said first profiles from said feedblock said adaptor means having
- first and second faces;
- an entrance port in said first face receiving said first profiles;
- an exit port in said second face corresponding to the entrance of the extrusion die; and
- a transition zone between said entrance and exit ports wherein said first profiles become contiguous and the overall configuration of said contiguous first profiles is adapted for receipt by said extrusion die.

24. An apparatus, as set forth in claim 23, said fin means being provided in said land.

25. An apparatus, as set forth in claim 23, wherein said exit ports extend to the surface of said feedblock rear face maintaining said flow streams of feed materials passing therethrough distinct and separate from adjacent layers.

26. An apparatus, as set forth in claim 23, said manifold having a first exit port and said feedblock having a first entrance port for passage of a first feed material in a first flow stream; and
said manifold having a second exit port and said feedblock having a second entrance port for passage of a second feed material in a second flow stream.

27. An apparatus, as set forth in claim 26, said system further comprising:

reverser plate means interposed between said manifold and said feedblock;

said reverser plate means having
- at least first and second entrance ports for said first and second feed material flow streams from said manifold;
- at least first and second exit ports for said first and second feed material flow streams to pass into said feedblock; and
- at least a first channel directing said first feed material flow stream to said second entrance port of said feedblock; and
- at least a second channel directing said second feed material flow stream to said first entrance port of said feedblock.

28. An apparatus, as set forth in claim 23, wherein said channel means includes
a preland communicating with said entrance port; and
a land communicating with said exit port and receiving said feed material from said preland.

29. An apparatus, as set forth in claim 28, wherein walls forming said preland are streamlined and configured to reduce the cross-sectional area of said flow stream of feed material therein to that of said exit port carried by said feedblock.

30. An apparatus, as set forth in claim 29, wherein walls forming said land are streamlined and configured to alter the configuration of said flow stream of feed material to that of said exit port carried by said feedblock.

* * * * *